July 29, 1952 C. D. MYER 2,604,905
FLUSH VALVE
Filed April 24, 1947

INVENTOR.
Claus D. Myer
BY
Munn, Liddy & Glaccum
Attorneys

Patented July 29, 1952

2,604,905

UNITED STATES PATENT OFFICE 2,604,905

FLUSH VALVE

Claus D. Myer, Grantwood, N. J., assignor to Myer Flushometer Co., Grantwood, N. J., a partnership composed of Claus D. Myer and Elizabeth Myer Application April 24, 1947, Serial No. 743,518

2 Claims. (Cl. 137—665)

This invention relates to new and useful improvements in flushing valves and has especial reference to improvements over the general type of valve shown in my U. S. Patent No. 1,722,155 issued to me July 23, 1929 and entitled "Flush Valves."

An object of the invention is to provide a valve structure in which the parts are related to prevent solid material above certain sizes to pass into the valve while permitting the free passage of water therethrough.

A further object is to simplify the parts and reduce their number and thereby achieve simplicity and economy of operation, and manufacturing costs.

A still further object is to provide a device in which a valve and piston are combined in one unit to pass water and shut it off and at the same time to control its flow and the time of stoppage after opening.

Further and more specific objects, features, and advantages will more clearly appear from the detailed description hereinafter set forth especially when taken in connection with the accompanying drawings which illustrate a present preferred form which the invention may assume and which form part of the specification.

Briefly and generally stated, the invention includes a valve casing with a piston slidable therein and normally disposed against a valve seat, with means to maintain balance of liquid pressure on both sides of the piston when the piston is seated, and manually-operated means to upset said balance whereby the piston is moved to permit passage of liquid through the seat.

Further, the invention includes a passage in the casing connecting both sides of the piston to permit water to freely flow from one side to the other, an opening in the piston, and a manually-operated stem to close said opening and to expose it when operated whereby the balance is upset.

Further, the invention includes a ring-plate around the piston of larger diameter than the piston to permit passage of material of predetermined size and thereby avoid clogging of the valve.

The present preferred form which the invention may assume is illustrated in the drawings, in which, Fig. 1 is a vertical cross-section taken on the line 1—1 of Fig. 2;

Figure 1:
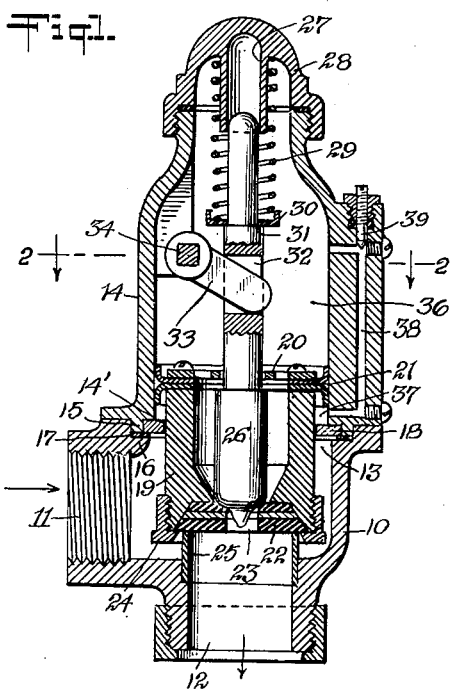
Figure 3:
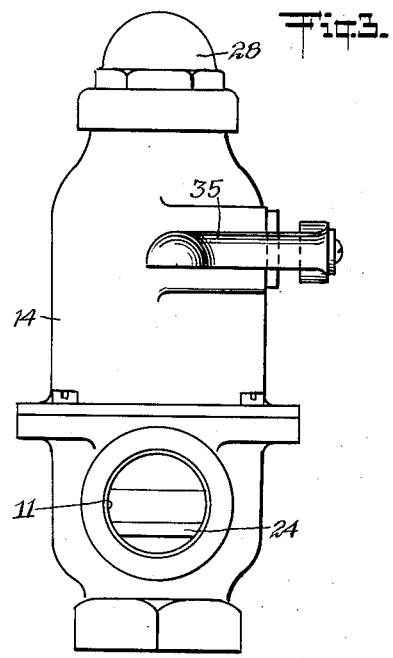
Fig. 3 is a side elevation looking from the left in Fig. 1.
Figure 2:
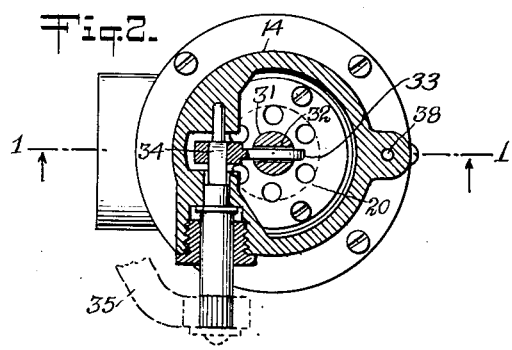
Fig. 2 is a horizontal cross-section taken on the line 2—2 of Fig. 1.
Figure 4:
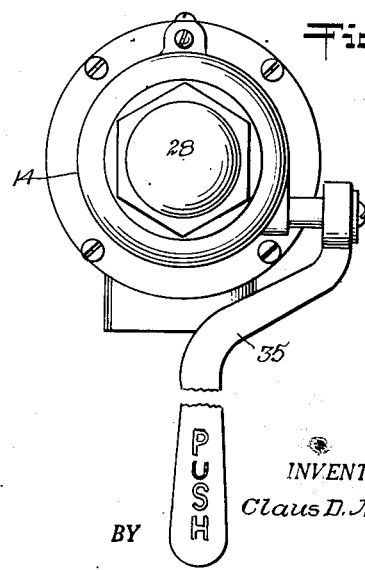
Fig. 4 is a plan view of the device.

Referring now merely to the specific forms of the invention shown in the drawing, it will be seen that the device comprises a casting 10, having an inlet passage 11 and an outlet passage 12 and with an open top 13. On top of casting 10 is seated a valve cylinder casing 14 having a bottom flange 14' resting on the top of casting 10 and a dependent rib 15 nested in a circular cut-out 16 in the casting 10 and on a gasket ring 17 therein to seal the connection. A diaphragm plate or ring 18 is also held against gasket 17 by the valve casing 14 and its inner diameter is slightly larger than the outer diameter of a valve piston 19 slidable within the cylinder 14. The piston 19 is hollow and has a perforated plate 20 screwed to its top and rubber washers 21 held between the top of the piston and the plate 20, which washers frictionally engage the walls of the cylinder 14 and make a liquid tight joint, as the piston is moved up and down in the cylinder.

At its bottom, the valve piston is provided with a valve element or disk 22 having a central opening 23 therein. This disk is tapered to bear in a similarly-shaped recess in the bottom of the piston and is held in place by a flanged threaded ring 24 as shown. A valve seat in the form of a pipe 25 is tight fitted into the casting 10 in line with the outlet passage 12 and the disk 22 normally rests on top of it when the valve is closed, that is, when the water is not to flow from the passage 11 directly to the passage 12.

The opening 23 in the center of valve disk 22 is the control opening and it is closed by a control valve stem 26 having a tapered and rounded end to fit into the opening 23. The upper end of the control stem slides in small cylinder 27 dependent from a cap 28 screwed to the top of the valve cylinder 14. A spring 29 surrounds the stem and the cylinder 27 and extends between the inner surface of the cap 28 and a washer 30 resting on a shoulder 31 on the stem 26 so that the stem is always urged downwardly by the spring. The stem is provided with a slot 32 into which projects an arm 33 on a shaft 34 extending through the cylinder casing 14 and having on its outer end a manually operable handle 35.

When the piston is at the bottom of its stroke it divides the cylinder casing 14 into an upper larger chamber 36 and a smaller lower chamber 37. A passage 38 in the wall of the casing 14 leads from the upper chamber 36 to the lower chamber 37, and the flow of fluid therethrough is controlled by a needle valve 39. In the position shown in Fig. 1 the parts are all in closed position and no water is flowing therein.

In the operation of the device, and with the parts in the positions shown, when it is desired to flush the device, the handle 35 is depressed. This lifts arm 33 to raise the stem 26 against the resistance of spring 29. This movement exposes the disk opening 23. When the parts are as shown, water is disposed in the upper chamber 36 and in the interior of the piston. Now, when the stem is lifted this water rushes through the plate 20, through the piston and through the opening 23 and out the passage 12. A liquid pressure is maintained on the upper side of the piston when the parts are closed, but with this lifting of the stem water leaves chamber 36 through the opening 23 and the pressure of the water in lower chamber 37 presses against the piston head and washers from below and forces the piston 19 up to the top of its stroke. Water can flow from chamber 37 through passage 38 into upper chamber 36 but as long as the opening 23 is exposed this water will continue to flow out and preserve the imbalance. However, as soon as the hand is taken off handle 35, the spring 29 moves the stem to close opening 23 and the water flowing into the chamber 36 commences then immediately to build up the pressure in chamber 36 to equal that in chamber 37. When the piston is seated and the disk 22 is resting on the seat 25 the flow of water stops and the pressure on the two sides of the piston in the chambers 36 and 37 is restored and the parts are restored to normal as shown herein.

The diaphragm or strainer plate 18 fits loosely around the exterior wall of the piston and the amount of passage permitted thereby determines what sizes of material can pass through with the liquid into the interior of the casing 14. The size of material is never to be larger than that which can pass through the passage 38 so that the valve will never tend to become clogged.

The speed at which the valve closes after the hand is removed from the handle 35 is determined by the setting of the needle valve 39 in the passage 38 which determines how rapidly the water passes from chamber 37 into chamber 36 to restore the pressure condition.

Figure 5:
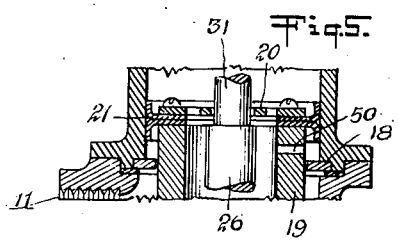
Fig. 5 is a modification of the invention.

The form shown in Fig. 5 is particularly adapted for a flush of water without timing such as would be used on urinals and similar devices. As shown in Fig. 5 the piston 19 is drilled at 50 and the bypass 38 is eliminated. When the stem 26 is raised water will pass through the opening 50 and plate 20 to both sides of the plate 20 which will enable the spring to close the valve.

While the invention has been described in detail and with respect to a present preferred form which the invention may assume, it is not to be limited to such details and form since many changes and modifications may be made in the invention without departing from the spirit and scope of the invention in its broadest aspects. Hence it is desired to cover any and all forms and modifications of the invention which may come within the language or scope of any one or more of the appended claims.

I claim:

1. A flush valve comprising a casing having inlet and outlet passages, a hollow piston slidable in said casing, said piston having an opening in its bottom, a perforated plate covering the top of the piston, rubber washers fixed between the perforated plate and the piston and frictionally engaging the walls of the casing in liquid tight fashion, a reciprocably mounted stem disposed within the piston and controlling flow through said piston opening, a passage in the casing opening both above and below the washers, and a thin ring-plate fixed in the casing about said piston beneath the lower opening of the last mentioned passage and extending inwardly toward said piston to define a narrow annular passage between said piston and ring plate, the width of said annular passage being substantially less than the diameter of last mentioned passage.

2. A flush valve for use on vessels navigating dirty waters comprising a casing having inlet and outlet passages, a hollow piston slidable in said casing, said piston having an opening in its bottom, a perforated plate covering the top of the piston, rubber washers fixed between the perforated plate and the piston and frictionally engaging the walls of the casing in liquid tight fashion, a reciprocably mounted stem disposed within the piston and controlling flow through said piston opening, a passage in the casing opening both above and below the washers, and a ring-plate fixed in the casing about said piston beneath the lower opening of the last mentioned passage and extending inwardly toward said piston to define a constricted annular passage between said piston and ring plate, the width of said annular passage being less than the diameter of said last mentioned passage so that none of the dirt in the water will clog the constricted passage, and means external of the casing engaging said stem to open and close said piston opening.

CLAUS D. MYER.

REFERENCES CITED

The following references are of record in the file of this patent:

UNITED STATES PATENTS

| Number | Name | Date |
| --- | --- | --- |
| Re. 14,067 | Perkins | Feb. 15, 1916 |
| Re. 20,246 | Binnall | Jan. 19, 1937 |
| 947,183 | Lewis | Jan. 18, 1910 |
| 1,660,352 | Payne | Feb. 28, 1928 |
| 1,771,772 | Collito | July 29, 1930 |
| 2,243,957 | Heine | June 3, 1941 |